United States Patent [19]
Schrock et al.

[11] Patent Number: 5,845,161
[45] Date of Patent: Dec. 1, 1998

[54] STYLUS BASED ELECTRONIC ANNOTATION CAMERA

[75] Inventors: Anthony W. Schrock, Rochester; Paul E. Spencer, Livonia, both of N.Y.

[73] Assignee: Eastman Kodak Company, Rochester, N.Y.

[21] Appl. No.: 808,702

[22] Filed: Feb. 28, 1997

[51] Int. Cl.[6] .................................................. G03B 17/24
[52] U.S. Cl. ........................................... 396/313; 396/310
[58] Field of Search .............................. 396/57, 310, 313

[56] References Cited

U.S. PATENT DOCUMENTS

| | | | |
|---|---|---|---|
| 1,848,814 | 3/1932 | Allen | 354/107 |
| 4,020,492 | 4/1977 | Sumio | 346/107 |
| 4,330,186 | 5/1982 | Hattori | 354/106 |
| 4,705,372 | 11/1987 | Lapeyre | 354/106 |
| 4,977,419 | 12/1990 | Wash et al. | 354/76 |
| 5,130,745 | 7/1992 | Cloutier et al. | 355/40 |
| 5,155,513 | 10/1992 | Matsumura et al. | 354/106 |
| 5,162,830 | 11/1992 | Schappler et al. | 354/106 |
| 5,289,217 | 2/1994 | Rosenblatt | 354/76 |
| 5,323,203 | 6/1994 | Maruyama et al. | 396/57 |
| 5,376,981 | 12/1994 | Itoh | 354/106 |
| 5,392,447 | 2/1995 | Schlack et al. | 395/800 |
| 5,689,742 | 11/1997 | Chamberlain, IV | 396/313 |
| 5,710,947 | 1/1998 | Teremy et al. | 396/313 |
| 5,717,967 | 2/1998 | Lee et al. | 396/313 |

*Primary Examiner*—Russell E. Adams
*Attorney, Agent, or Firm*—James D. Leimbach

[57] ABSTRACT

A stylus based annotation system for cameras comprising a touch screen display on the camera for implementing stylus input, a first memory for storage of image annotation data, a second memory for storage of annotation data that is repeated between multiple images, a recording device for placement of annotation data on images and stylus sensor to detect removal and replacement of the stylus to effect a mode change

15 Claims, 3 Drawing Sheets

STYLUS BASED ELECTRONIC ANNOTATION CAMERA

FIELD OF THE INVENTION

The present invention relates to cameras and more particularly to annotation systems used within cameras.

BACKGROUND OF THE INVENTION

Images are often used to convey information, but often the image alone does not contain all the desired information. Image annotation is the process of adding additional information the image for such uses as enhanced image enjoyment, reminders of the people or places in the image, industry applications, education, classification, and other imaging utilization areas that can benefit from incorporating additional information.

Annotation can be added to images at various instances through the image acquisition and production process, through a variety of methods. It is often desirable to provide for annotation input at the time of picture taking. This suggests some form of on-camera annotation means that does not interfere with the picture taking process.

One early example of on-camera annotation is described in U.S. Pat. No. 1,848,814 where stylus pressure causes an opaque medium to temporarily transmit light, thereby exposing the film along the stylus path, as in an "autographic" camera. Earlier implementations used a transfer process to embed a dark material on the film.

It is also known to use a pantographic type mechanism as well to allow a larger writing area.

More recently, cameras have been developed with "date back" capabilities to automatically expose the film with the current date. While the automation is a desirable feature, the date exposure may be over a critical portion of the picture. This problem is further aggravated if additional information is exposed into the image area. U.S. Pat. No. 4,705,372 addresses this by exposing the film outside the image area. This is limited to the area not already used by latent image encoding, such as film identification bar codes.

Another problem arises in data entry. Date backs often do not provide enough information. U.S. Pat. Nos. 4,330,186 and 5,289,217 describe a keyboard entry system to add information to an image. While this increases flexibility, laboriously typing in the annotation on a small keyboard interferes with picture taking. Conversely, limiting the annotation data to a few preselected titles as described in U.S. Pat. No. 5,155,513 also limits the customization capabilities.

The Advanced Photo System has addressed the issue of writing data by incorporating a magnetic layer on the film to store information. As described in U.S. Pat. Nos. 5,130,745 and 4,977,419, the magnetic layer allows photometric and annotation data to be stored separately from the image data, much the same way that a digital image can have additional information stored that is not part of the image data. Additionally, this allows the stored data to be changed at a later time. However, the issues of flexibility and ease of use remain.

SUMMARY OF THE INVENTION

It is the object of this invention to provide graphical annotation input means that minimizes disruption to the picture taking process while allowing the greatest amount of customization of the data. Since pictures taken at events will often have similar annotations, it is a further objective to allow the user to quickly tag related pictures with similar annotations over a few frames or an entire roll. It is also an objective of this invention to allow the user to rapidly enter and leave annotation mode.

The invention comprises a display means, such as an LCD, a touch sensing means, a first memory means to store the data, indexing means to correlate the annotation data to a particular image, a second memory means to store annotation data that is repeated image to image, compression means to compress the data to reduce the amount of storage required, and stylus sensing means to detect removal and replacement of the stylus to effect a mode change.

ADVANTAGEOUS EFFECT OF THE INVENTION

The advantages of this invention are use of a stylus and a "digital ink" display to employ a natural input means to create new graphical annotations. An additional feature is the increased ease of recall of previous annotations for reuse and modifications, and reduction of accidental picture taking while annotating by deactivating the shutter. The use of a re-recordable storage medium such as magnetic or semiconductor storage that is linked to the image allows changes in the annotation to be made at a later date.

DETAILED DESCRIPTION OF THE INVENTION

Figure 1:
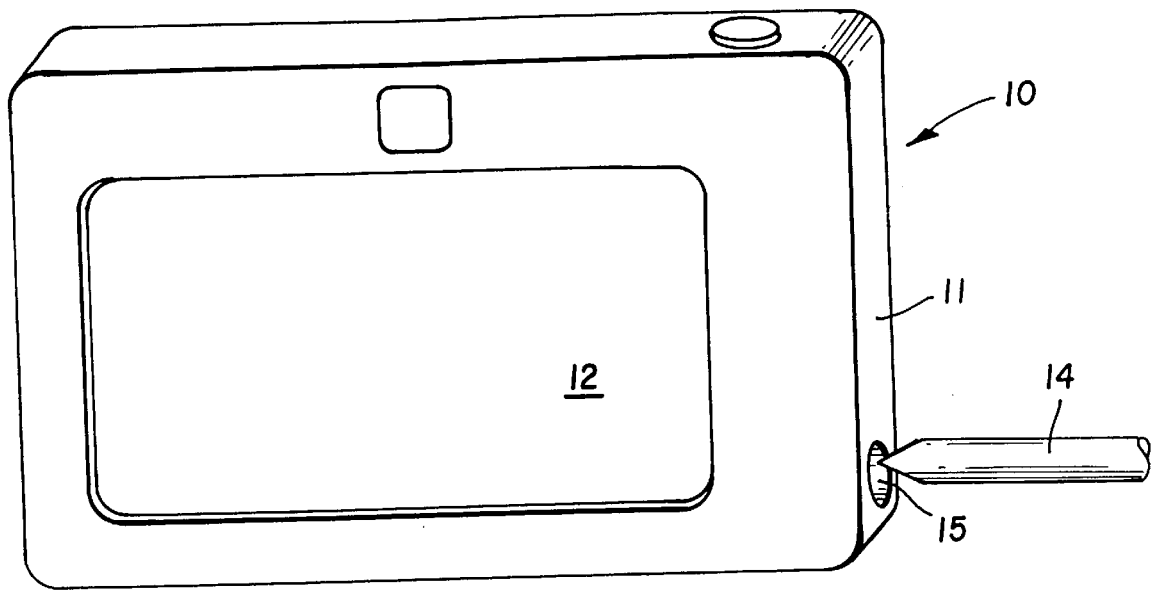
FIG. 1 is a camera as envisioned by the present invention.

FIG. 1 shows a camera, generally referred to as 10, with a touch sensing LCD display screen 12 and a stylus 14 which is stored in a cavity 15 in the camera body 11.

Figure 2:
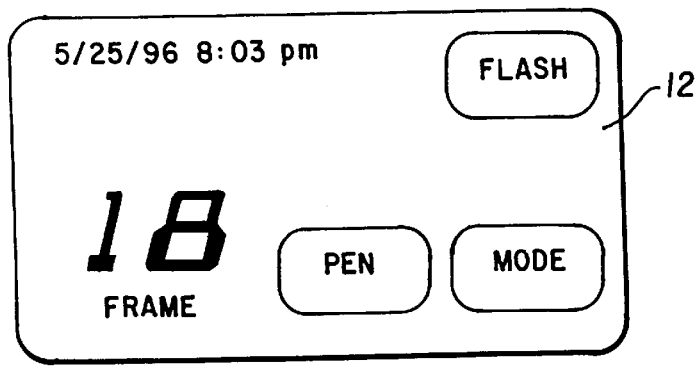
FIG. 2 is a.display as envisioned being used with FIG. 1 in the operational mode.
Figure 3:
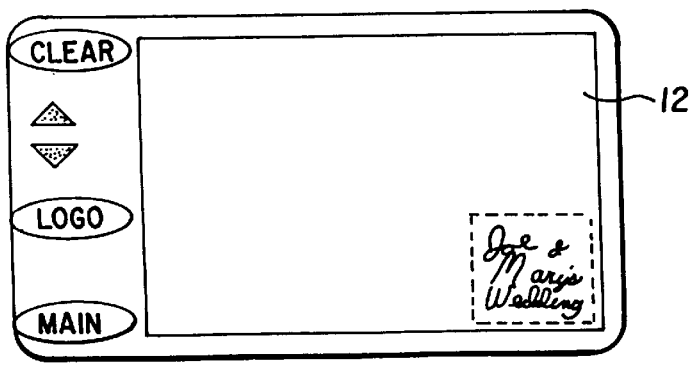
FIG. 3 is the display as envisioned being used in the annotation mode.

FIGS. 2 and 3 show the display 12 illustrating the touch screen in two major modes of operation. The touch sensing screens used for display 12 can be any one of devices well known in the art, such as resistive, capacitive, or electromagnetic position sensors that are placed in front or behind the display 12. A number of touch screen technologies are described in the Nov. 9, 1995 issue of Electronic Design News, pgs 52–62.

FIG. 2 shows the display 12 in the "main" or default mode. This mode displays standard information about the camera, such as frame number, film speed, date and time, and "virtual buttons" are provide on the screen that allow the user to change camera parameters such as flash and program parameter control.

FIG. 3 shows the annotation mode, where a large portion is reserved for writing or drawing with a stylus. The touch sensing electronics detects the coordinates of the stylus and displays a line of pixels following the path of the stylus in a manner known in the art as "digital ink". Annotation mode also has virtual buttons to control the input, such as a "clear" key to erase all of the annotation for an image, up and down arrow keys to access other annotations previously used, and a "logo" key which allows a portion of the displayed digital ink to be designated as a logo, which in repeated in subsequent frames.

Figure 4A:
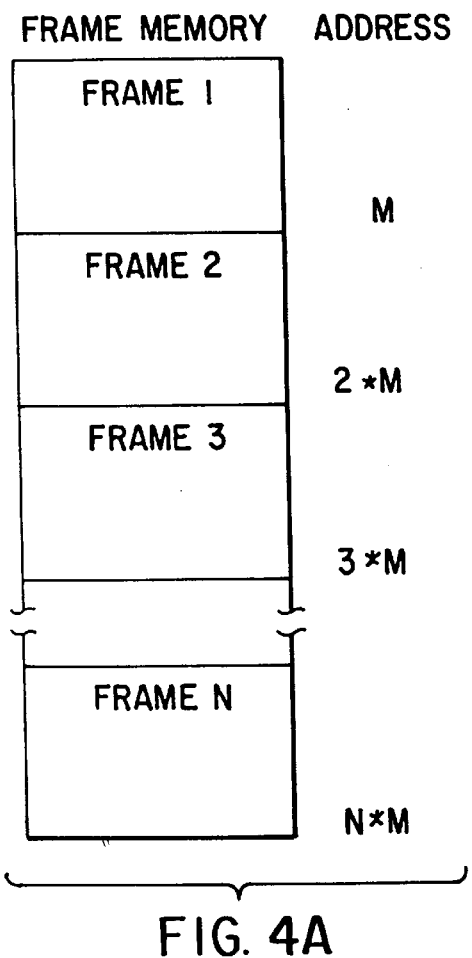
FIGS. 4A and 4B schematic representations of the memory structure.
Figure 4B:
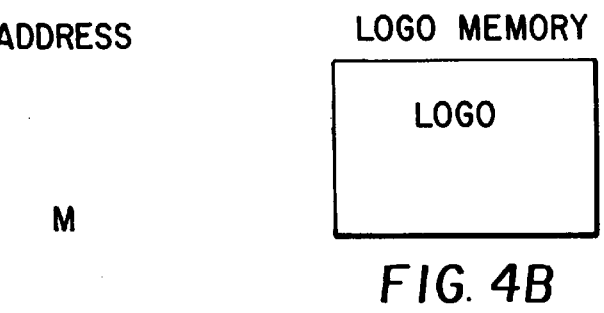

To input annotation, the user "writes" on the screen with the stylus, and when the data is satisfactory, takes a picture. A digital representation is stored in a memory area as shown in FIG. 4A, which shows that data corresponding to a particular frame is stored in a block of size M. If the user wishes to use a prior annotation data, the arrow "buttons" shown in FIG. 3 are used to page to the area in memory that holds the prior annotation. If the annotation is modified, the modified version is stored in the corresponding memory area, either as a new annotation or as a difference from the original annotation used, saving storage space. If the user uses a prior annotation, all that needs to be stored is the reference to the memory area that contains the annotation data. If a portion of the image is to be designated as a logo, or repeated area, the logo portion is drawn, the logo button is tapped, and the logo portion of the display is delineated by the stylus, and the logo button is pushed again to store the logo in the logo memory area as shown in FIG. 4B. If the logo is active, this stored data overwrites any data in that area of the annotation display.

Figure 5:
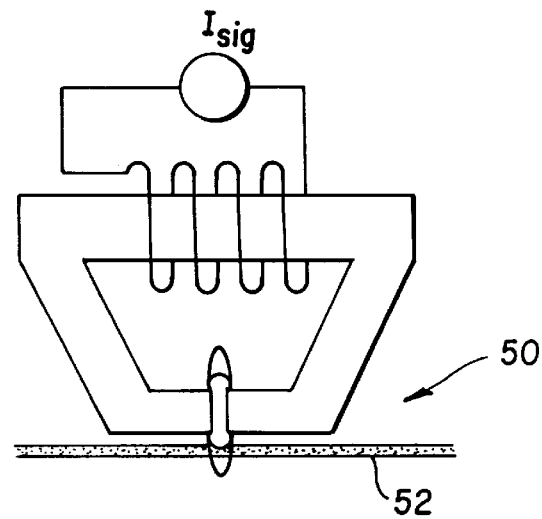
FIG. 5 is a schematic representation of the magnetic recording circuitry.
Figure 6:
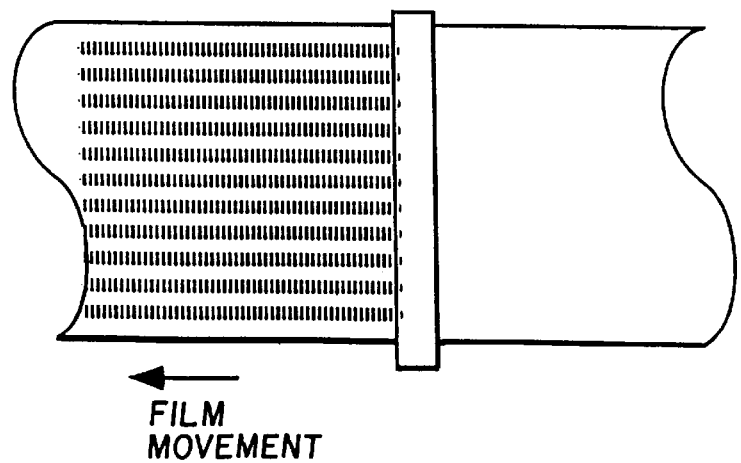
FIG. 6 is an illustration of the recording of magnetic data on film.

To store the annotation, frame data and any logo information are compressed via a compression algorithm, such as facsimile compression to reduce the amount of data stored. This is then stored with the image. In a digital camera, this is stored in the same manner as the image data in a memory means, such as a semiconductor memory. In film cameras with a magnetic layer, this is preferably stored on the magnetics layer. FIG. 5 shows a magnetic write head 50, where Isig induces a flux transition on the magnetics layer 52, and this is written by one or more heads as shown in FIG. 6. A full description of the system to store on the magnetics is found in the '419 and '745 patents, now incorporated by reference.

Figure 7A:
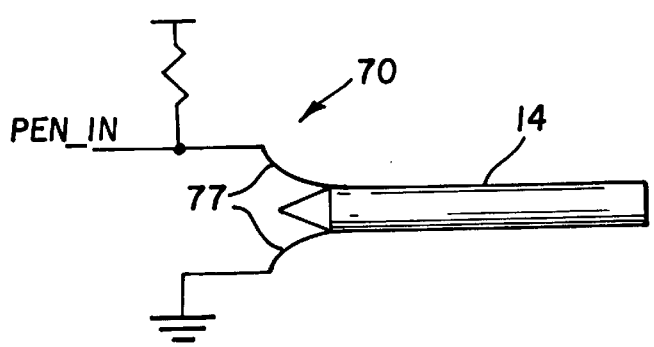
FIG. 7A is an embodiment of stylus detection with the stylus inserted.
Figure 7B:
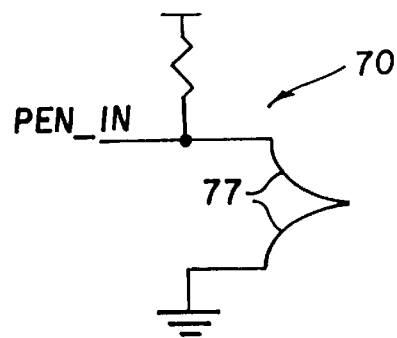
FIG. 7B is the embodiment of stylus detection with the stylus removed.
Figure 8:
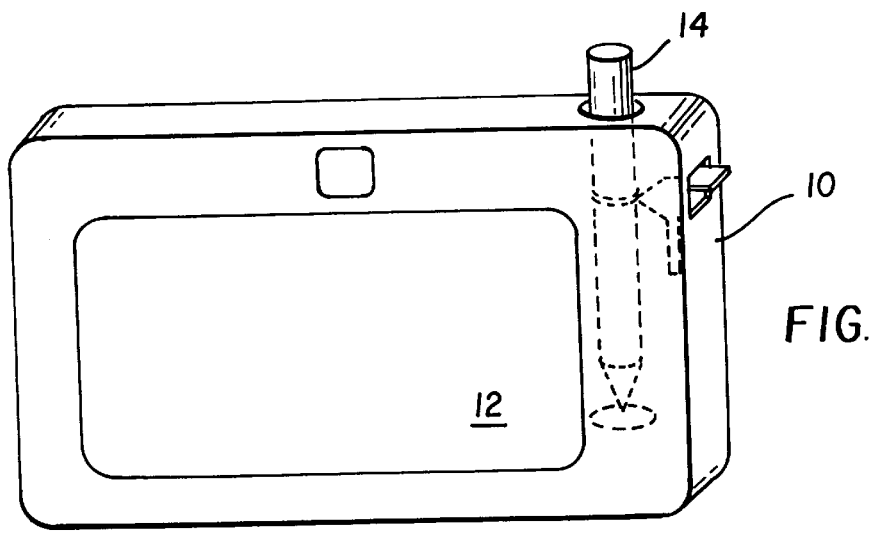
FIG. 8 is an embodiment showing shutter disabling.

A further feature of the invention is shown in FIGS. 7 and 8. Removal of the stylus 14 is detected by sensing circuit 70 and automatically shifts the camera to the annotation mode shown in FIG. 3. This shifting to the annotation mode happens regardless of the mode the camera was in. Additionally, the touch sensing means is switched to a high resolution mode to detect fine motions of the stylus 14, rather than coarse positional information of the buttons in the "main" mode.

FIG. 7A shows a sensing circuit 70 in which spring loaded conductive material 77 is held apart by a non conductive stylus 14. The signal Pen_in is pulled to the supply voltage by resistor R. When the pen is removed in FIG. 7B, the spring loaded arms contact each other, pulling the Pen_in signal to ground. When this signal is detected as low, the camera microcontroller switches the display to annotation mode and disables the shutter to prevent unintentional picture taking during annotation. It is obvious to one skilled in the art that this pen sensing can be carried out by a number of means, such as using conductive pens between non-spring loaded material or optical sensing.

Figure 9:
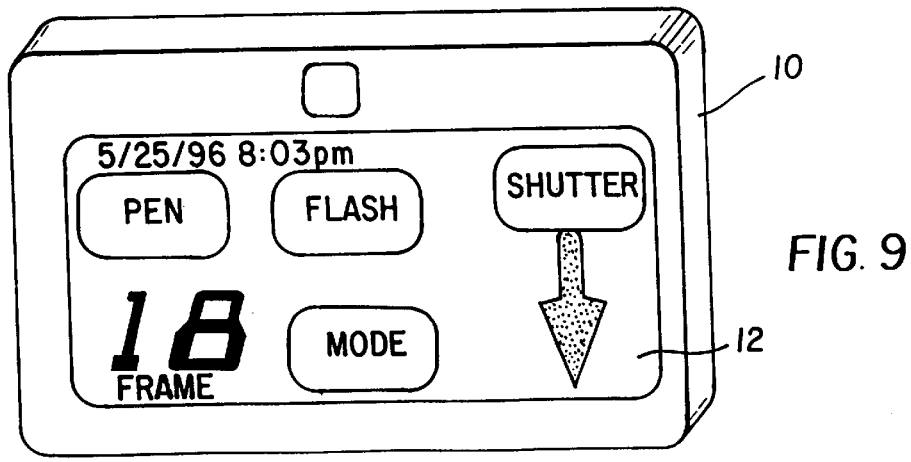
FIG. 9 is an embodiment showing an alternate operational mode.

FIG. 8 shows an alternative method of disabling the shutter where the pen is part of the shutter mechanism, so that removal of the pen automatically prevents shutter activation. FIG. 9 shows another embodiment that uses no mechanical shutter button. Instead, the shutter button is part of the touch screen. When the user touches the shutter portion of the screen, the camera checks focus and photometric data, corresponding to a partial push in conventionally shuttered cameras. To take the picture, the finger is slid in the direction of the arrow, corresponding to a full shutter press in conventionally shuttered cameras.

It is also a feature of the present invention that the automatic mode switching can be overridden by user selection of pen and main modes as shown in FIGS. 2 and 3.

While the foregoing description has disclosed the preferred embodiments of the present invention, obvious variations will be apparent to those skilled in the art, therefore the scope of the invention should measured in view of the appended claims.

PARTS LIST 10 camera
11 camera body
12 display screen
14 stylus
26 cavity
50 write head
52 magnetic layer
70 sensing circuit
77 spring loaded conductive material

We Claim:

1. A stylus based annotation system for cameras comprising:
   display means on the camera for stylus input;
   first memory means for storage of image annotation data;
   a second memory means for storage of annotation data that is repeated between multiple images;
   recording means for placement of annotation data on images; and
   stylus sensing means to detect removal and replacement of the stylus to effect a mode change.

2. A stylus based annotation system of claim 1 wherein the stylus is removed activating an annotation mode within the camera.

3. A stylus based annotation system of claim 1 wherein the stylus is removed deactivating the operation mode of the camera.

4. The annotation system of claim 3 wherein removal of the stylus deactivates the shutter.

5. The annotation system of claim 4 wherein the shutter is deactivated electronically by removal of the stylus.

6. The annotation system of claim 4 wherein the stylus is part of the shutter mechanism.

7. The annotation system of claim 4 wherein the shutter is deactivated by disabling the display of the shutter function by removal of the stylus.

8. The annotation system of claim 1 wherein the camera is an APS camera.

9. The annotation system of claim 1 wherein the camera is a digital camera.

10. The annotation system of claim 1 wherein the display means is an LCD touch sensing display panel.

11. The annotation system of claim 1 further comprising compression means to compress the data for reducing the amount of storage required.

12. The annotation system of claim 1 further comprising indexing means for correlating the annotation data to a particular image.

13. The annotation system of claim 1 further comprising override means to effect mode change regardless of stylus position.

14. The annotation system of claim 1 wherein data stored in the first memory means contains a reference to previously stored annotation data.

15. The annotation system of claim 1 wherein data stored in the first memory means contains a reference to previously stored annotation data in and additional data.

\* \* \* \* \*